United States Patent Office 3,549,680
Patented Dec. 22, 1970

3,549,680
METHOD OF PREPARING ORGANO-HALOGENOSILICON COMPOUNDS
Karl-Heinrich Wegehaupt and Siegfried Nitzsche, Burghausen, Upper Bavaria, Manfred Wick, Munich, and Hermann Triem, Ingelheim (Rhine), Germany, assignors to Wacker-Chemie G.m.b.H., Munich, Bavaria, Germany
No Drawing. Filed Jan. 2, 1968, Ser. No. 694,826
Claims priority, application Germany, Jan. 4, 1967, W 43,112
Int. Cl. C07f 7/02
U.S. Cl. 260—448.2
7 Claims

ABSTRACT OF THE DISCLOSURE

Certain phosphorous-nitrogen compounds are employed as catalysts in the reaction of halogenosilicon compounds with organosiloxanes free of halogen to produce organohalgenosilicon compounds differing from the starting materials.

---

This invention is a method of preparing organohalogenosilicon compounds by reacting halogenosilicon compounds with organosiloxanes free of silicone bonded halogen employing phosphorous-nitrogen compounds as catalysts.

The reaction of organohalogenosilicon compounds with organosiloxanes free of halogen to produce organohalogenosilicon compounds is known. This reaction has been carried forward using hydrogen halides, Lewis acids such as ferrochlorides, amides, alkali metal halides, inert polar solvents, amines, amine salts and ammonium salts as catalysts. However, these known catalysts for the reaction not only effect the desired reaction but also cleave organic radicals from the silicon atoms thereby effecting undesired cross-linking and/or polymerization. Many of the known catalysts are effective only with cyclic trisiloxanes, which are in short supply and therefor expensive, or in combination with quantities of inert polar solvents which increase the processing costs and must be reprocessed to recover them. Further, many of the known catalysts require long reaction times and/or severe reaction conditions (e.g. high temperature and/or high pressure) and they may be effective only to produce a narrow range of recoverable products (e.g. trimethylhalogenosilane) having limited commercial potential.

It is an object of the present invention to introduce a novel catalyst for the reaction of halogenosilanes with halogen free organosiloxanes to produce halogenosilicon compounds. A new and commercially practical method for preparing useful organohalogenosilicon compounds from less desirable and less useful silicon compounds is also sought. A catalyst system for effecting reaction of mixtures of organohalogenosilicon compounds and halogen-free organosiloxanes which does not suffer the problems set forth in the preceding paragraph is also sought. These and other objects and advantages are accomplished by the invention described and claimed below.

The present invention is a method for preparing organohalogenosilicon compounds by reacting halogenosilicon compounds with organosiloxanes free of halogen bonded to silicon, employing as catalysts compounds having phosphorous bonded nitrogen. The catalyst can be inactivated after the reaction has run its course employing techniques described below.

The invention is based on the use of certain phosphorous-nitrogen compounds as catalysts in a rearrangement reaction in the organosilicon area. The phosphorous-nitrogen catalysts can be classified as phospho-nitrile halides and certain organonitrogen derivatives of phosphorous acid or phosphoic acid. These catalysts are known for use as polymerization catalysts in polymerizing polyorganosiloxanes (see e.g. U.S. Pat. No. 2,830,967, issued Apr. 15, 1958). However, the known polymerization reaction is a condensation reaction (see "Chemie und Technologie der Silikone" by W. Noll, Verlag Chemie, Weinheim, Germany, 1960, page 138). The reaction described herein does not involve condensation and, in fact, must avoid condensation-polymerization hence the effectiveness of these catalysts herein is totally unexpected.

The catalysts operable herein include amide halides of phosphorous and phosphoric acid defined by the formulae

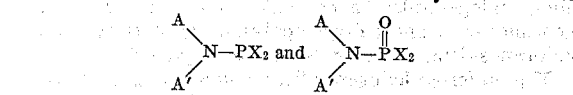

wherein A and A' represent alkyl, aryl, alkaryl and aralkyl radicals or hydrogen atoms and X is a halogen atom. It is preferred that the A and A' radicals contain not more than 12 carbon atoms each and X is preferably chlorine. Examples of the operable compounds include $$C_6H_5NH—PCl_2$$

$$C_6H_5—N(CH_3)—PCl_2, C_6H_5—N(C_2H_5)—PCl_2$$

$$(C_6H_5)_2N—PCl_2, CH_3—NH—PCl_2$$

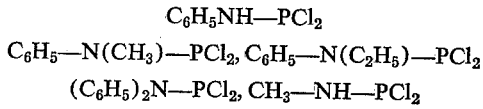

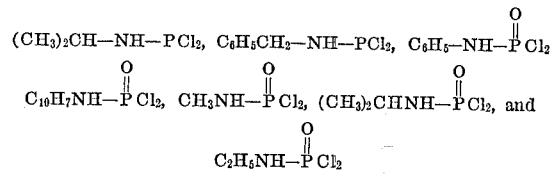

$$\overset{O}{\underset{\|}{C_2H_5NH-PCl_2}}$$

The phosphoronitrile halides are, however, preferred as catalysts herein. The polymeric products obtained by reacting phosphoropentachloride with ammonium chloride in accordance with the known method described in "Berichte der deutschen Chemischen Gesellschaft," vol. 57 (1924), pages 1345–1346, and "Journal of the Chemical Society" (1960), pages 2542–2547. Particularly useful are the oily, linear phosphoronitrilechlorides represented by the formula $(PNCl_2)_n$ wherein $n$ has a value from 3 to 6 inclusive (i.e. $n=3, 4, 5$ or $6$).

The catalysts employed herein are employed in relatively small proportions in the reaction system. One can effectively employ proportions varying from mere traces of the catalyst in the reaction mass to 5% by weight based on the weight of silicon compounds present. Thus, the usual "catalytic amount" of this catalyst is effective but the best results based on reaction time, cost factors, removal of catalyst from the product, and reaction efficency is achieved employing 0.001 to 0.1% by weight of catalyst based on the total weight of silicon compounds present.

The catalysts can be incorporated in the reaction mass in the form of solutions in inert solvents. The operable solvent carriers for the catalysts are those organic solvents which do not react with phosphoronitrilechlorides and the silicon compounds incorporated in the method of this invention. The use of organic solvent solutions of the catalysts results in better distribution of the catalyst through the reaction mass as well as better control of the proportion of catalyst employed and easier processing. Suitable solvents for this purpose include hydrocarbon solvents such as benzene, toluene, xylene and petroleum ether; halohydrocarbons such as methylene chloride, perchloroethylene, 1,1,1-trichloroethane, and chlorobenzene. Preferably the cataylst solution contains 20–60% by weight of the phosphorous-nitrogen compound in the organic solvent. The amount of solvent required to incorporate the organic solvent-catalyst solution in the reaction mass is obviously very small and particularly in comparison to the amounts of solvents required in previously known reactions of this type.

The halogenosilicon compounds employed herein include those which have been known and used in the preparation of organohalogenosilicon compounds accomplished by reacting halogenosilicon compounds with organosiloxanes free of silicon bonded halogen. These halogenosilicon compounds must contain at least one halogen atom bonded to silicon per molecule and the remaining valences of the silicon atoms are satisfied by oxygen atoms present as SiOSi linkages, hydrogen atoms, hydrocarbon radicals, halogenoaryl radicals and fluoroaliphatic hydrocarbon radicals, and the silicon atom bonded to halogen should not have more than two organic groups bonded thereto. Included herein are halogenosilanes, halogenosilcarbanes, halogenosilcarboranes, halogenosiloxanes, and halogenopolysilanes. Mixtures of said halogenosilicon compounds can be employed.

The preferred halogenosilicon compound is a halogenosilane because of the ready availability of such compounds. Operable silanes can be defined by the formula $R_mSiX_{4-m}$ where R is a monovalent hydrocarbon radical, a halogenoaryl radical, a fluorinated aliphatic hydrocarbon radical or a hydrogen atom, $m$ is 0, 1, 2, or 3, and X is F, Cl, Br or I. Relatively low molecular weight polymers derived from the defined silanes by known hydrolysis and condensation techniques and containing residual Si—X bonds are also very useful and can be defined by the unit formula $$X_p R_m SiO_{\frac{4-m-p}{2}}$$

where $p$ has a positive value (i.e. at least one X per-molecule), $m$ has an average value from 0 to less than 3.0, and $m+p$ does not exceed 3.0.

The halogenosiloxanes employed herein include polymers and copolymers of any desired combination of units selected from $R_3SiO_{1/2}$, $R_2SiO$, $RSiO_{3/2}$, $SiO_2$, $R_2XSiO_{1/2}$, $XRSiO$, $XSiO_{3/2}$, $X_2SiO$, $X_3SiO_{2/4}$, $X_1RSiO_{2/2}$, and any other mono-, di- and /or tri-functional siloxane units having X and R substituents, but the polymer molecule must contain at least one unit with an X—Si group and X and R are as defined above. The operable polymers can contain SiR'Si linkages wherein R' is a divalent hydrocarbon radical such as methylene, ethylene, and phenylene hence silcarbanes and silcarboxanes are included herein.

The siloxanes free of halogen bonded to silicon employed herein include siloxanes wherein the units are selected from $R''_3SiO_{1/2}$, $R''_2HSiO_{1/2}$, $R''H_2SiO_{1/2}$, $H_3SiO_{1/2}$, $R''_2SiO$, $R''HSiO$, $H_2SiO$, $R''SiO_{3/2}$, $HSiO_{3/2}$ and $SiO_2$ wherein each R'' is a monovalent hydrocarbon radical, a halogenated aryl radical or a fluorinated aliphatic hydrocarbon radical. These siloxanes can be homopolymers or copolymers, linear, cyclic or cross-linked, and preferably contain an average of 2–3 R'' groups per silicon atom. If the siloxane is cyclic, it is preferably a tetramer, pentamer or higher cyclic (i.e. cyclic trimers are not used).

Examples of monovalent hydrocarbon radicals for the halogen silicon compounds as well as for the Si-halogen free organosiloxanes (therefore, for the R and R'' hydrocarbon radicals in the above formulae) are alkyl radicals such as methyl, ethyl, isopropyl, isobutyl, tert.-butyl, 2-ethylhexyl, dodecyl, octadecyl and myricyl radicals; alkenyl radicals such as vinyl, allyl and hexadienyl radicals; cycloalkyl radicals such as cyclopentyl and cyclohexyl radicals; cycloalkenyl radicals such as cyclopentenyl and cyclohexenyl radicals; aryl radicals such as phenyl, napthyl and xenyl radicals; aralkyl radicals such as benzyl, phenylethyl and xylyl radicals and alkaryl radicals such as tolyl and dimethylphenyl radicals. The 2,4,6-trichlorobenzyl, perchlorophenyl, 2-bromonaphthyl, p-iodophenyethyl and p-fluorophenyl radical can be named as examples for aromatic hydrocarbon radicals with halogen atoms. Examples for aliphatic hydrocarbon radicals with fluorine atoms are 3,3,3-trifluoropropyl, alpha,alpha,alpha - trifluorotolyl, 3,3,4,4,5,5,5 - heptafluoropentyl and 5,5,5-trifluoro-2-trifluoromethylamyl radicals.

During the reaction one Si-bonded halogen atom replaces one oxygen atom which is bonded to an Si atom in the organosiloxane which is free of Si-bonded halogen and the remainder of the molecule to which the Si-bonded halogen atom belonged is satisfied by the liberated oxygen bond. This can occur according to the following equations:

$SiCl_4 + (CH_3)_3SiOSi(CH_3)_3 \rightarrow$
  $(CH_3)_3SiCl$
  $+ (CH_3)_3SiOSiCl_3$
  $+ [(CH_3)_3SiO]_2SiCl_2$
  $+ [(CH_3)_3SiO]_3SiCl$ etc.

$(CH_3)SiCl_3 + (CH_3)_3SiOSi(CH_3)_3 \rightarrow$
  $(CH_3)_3SiCl$
  $+ (CH_3)_3SiOSi(CH_3)Cl_2$
  $+ [(CH_3)_3SiO]_2Si(CH_3)Cl$ etc.

$(CH_3)_2SiCl_2 + (CH_3)SiOSi(CH_3)_3 \rightarrow$
  $(CH_3)_3SiCl$
  $+ (CH_3)_3SiOSi(CH_3)_2Cl$ etc.

$(CH_3)_2ClSi[OSi(CH_3)_2]_3Cl + (CH_3)_3SiOSi(CH_3)_3 \rightarrow$
  $+ (CH_3)_3SiCl$
  $+ (CH_3)_3SiO[Si(CH_3)_2O]_3 -$
   $Si(CH_3)_2Cl$ etc.

$SiCl_4 + [(CH_3)_2SiO]_4 \rightarrow$
  $Cl[Si(CH_3)_2O]_4SiCl_3$
  $\{Cl[Si(CH_3)_2O]_4\}_2SiCl_2$
  $\{Cl[Si(CH_3)_2O]_4\}_3SiCl$ etc.

In the above equations, the methyl radicals can be replaced by other organic radicals of the type described and the chlorine atoms by bromine, iodine or fluorine.

The viscosity of the silicon compounds employed in the method of the present invention is not critical. It is preferably beneath 100,000 cs./25° C.

The process of the present invention is preferably carried out at 15° to 30° C., i.e., at or nearly at room temperature. If desired, it can be carried out at lower or at higher temperatures but little advantage is achieved. The pressure applied in the method of the present discovery is ordinarily normal pressure. The preferred reaction times are between 4 and 20 hours.

In the method of the present discovery the reaction mixture is preferably stirred or shaken, in order to assure good distribution of the materials which are incorporated.

The concurrent use of large quantities of inert solvents as they are brought into the reaction mixture with the catalyst is certainly not necessary, preferably does not take place, but is of course not excluded.

Quite often excellent yields are obtained with the method of the present invention even at room temperature after reaction times of only 5 hours, while quite often reaction times of much more than 20 hours are necessary in the presence of catalysts with known methods of preparing organohalogen silicon compounds by reacting halogen silicon compounds with organosiloxanes containing no Si-bonded halogen.

If advantage is to be taken not only of the benefits which can be obtained by the process of the present discovery, such as the shorter reaction times, but also by the possibility of isolating halogen siloxanes from the mixture of the reaction products by distillation, then the catalyst must be made inactive after the reaction between the silicon compounds has run the desired course. This can be done by brief heating (viz. 1–10 minutes) to 200–250° C. or by adsorption on molecular sieves or by neutralizing with amines. Preferably the catalyst is inactivated with amines, especially with tert.-amines.

The preferred tert.-amines for this are those with an equivalent weight of under 300, especially those of the general formula $R'''_3N$ wherein $R'''$ is a monovalent hydrocarbon radical which can be substituted by a hydroxyl group and/or can be interrupted by one or more ethereal oxygen atoms. Examples of such R hydrocarbon radicals also serve for the hydrocarbon radicals $R'''$. The hydrocarbon radical $R'''$ which are substituted by a hydroxyl group and/or by one or more oxygen atoms are preferably hydroxyalkyl radicals such as the β-oxyethyl and gamma-oxypropyl radical or hydroxy alkyloxyalkyl radicals, viz., of the formulae $HOCH_2CH_2OCH_2CH_2$—, $HOCH_2CH_2CH_2OCH_2CH_2CH_2$— and $HO(CH_2CH_2O)_2CH_2H_2$—.

Examples of preferred amines are diethylbenzylamine, diethylisoamylamine, tri-n-butylamine, triisobutylamine, tri-sec-butylamine, dimethyl-lauryl-amine, dimethylethylamine, tri-n-propylamine, triisopropylamine, triethylamine, methyldiethylamine, triphenylamine, triisoamylamine, dimethyl-coconut oil amine, and triethanolamine. Mixtures of various tert.-amines can be used.

Preferably 1 to 1.1 mol amines are used per mol of phosphorous in the catalysts. For better distribution and simpler dosage the tert.-amines are also used in the form of a solution in an inert solvent, i.e., one which is non-reactive at room temperature with tert.-amines and silicon compounds used in the method of the present invention, for example, those cited in connection with the phosphorous compounds. Expediently these solutions contain 20–60% by weight of tert.-amine calculated on the total weight of solvent and amine.

The temperatures and pressure cited for the reaction of the Si compounds in the method of the present invention are also valid for neutralizing the catalysts with tert.-amines. For this neutralization the reaction mixture is also stirred or shaken in order to assure a good distribution of the materials which have been incorporated.

The method of the present discovery is suitable for introducing functional groups in the form of Si-bonded halogen atoms into molecules in which no such functionality was previously present.

The organohalogensilicon compounds prepared according to the process of the present invention can be used for all purposes for which organohalogensilicon compounds of the type which are obtained according to the present invention may be incorporated. This includes, for instance, their use as prepared or after prior reaction with water, amines, alcohols, amides, oximes, sodium acetate or other compounds with which organohalogensilicon compounds can be converted to silicon compounds with other functional groups than Si-bonded halogen to materials hardening to elastic or non-elastic molded articles or coatings based on organopolysiloxanes in the known manner; furthermore, the use as starting products for the preparation of other organosilicon compounds, viz., those which are used as stabilizers.

The phosphonitrilechloride used in the following examples was obtained according to the directions of "Berichte der deutschen Chemischen Gesellschaft," vol. 57, 1924, p. 1345, by heating 400 g. phosphorous pentachloride with 130 g. ammonium chloride in 1 liter tetrachloroethane to 135° C. until there was no more development of gas and distilling off the solvent. The residue which remained after distilling off the solvent was used without further processing. The following examples are included herein to illustrate the invention described above and claimed below. The scope of the invention is defined in the claims and is not restricted by the examples. The pressure at which boiling point is measured is indicated in mm. of mercury (e.g. $B.P._{10}$ is boiling point at 10 mm. Hg).

EXAMPLE 1

To a mixture of 2,243 g. methyltrichlorosilane and 2,436 g. hexamethyldisiloxane, there was added 7 ml. of a 30% solution of phosphoronitrilechloride in methylene chloride at 20° C. with concurrent stirring. After 20 hours, the mixture obtained was mixed with 5 ml. dimethyl-coconut oil amine and stirred for another ½ hour at 20° C. Thereafter the reaction mixture was fractionally distilled. Obtained: 2,091 g. trimethylchlorosilane; 1,582 g. (52% of the theoretical) 1,1-dichlorotetramethyldisiloxane, $B.P._{760}$ 125° C., $D_4^{25}$ 1,016; 425 g. (22% of the theoretical) 2-chloroheptamethyltrisiloxane $B.P._{760}$ 165° C., $D_4^{25}$ 0.9110.

EXAMPLE 2

A mixture of 1,057 g. phenyltrichlorosilane, 810 g. hexamethyldisiloxane and 10 ml. of the catalyst solution described in Example 1 was prepared and stirred for 15 hours at 80° C. Thereafter 6 ml. of dimethyl-coconut oil amine was added and 540 g. of trimethylchlorosilane was distilled off. Also obtained: 940 g. (71% of the theoretical) 1,1-dichlorophenyl-2,2,2-trimethyldisiloxane with a $B.P._{10}$ 104° C. ($D_4^{20}$ 1.0860).

EXAMPLE 3

A mixture of 323 g. of vinyltrichlorosilane, 325 g. hexamethyldisiloxane and 3 ml. of the catalyst solution described in Example 1 was stirred for 5 hours at room temperature. Thereafter 3 ml. of tri-n-butylamine was added. After another ½ hour of stirring at 20° C. the reaction mass was distilled. Obtained: 213 g. (50% of the theoretical) of 1,1-dichloro-1-vinyltrimethyldisiloxane, $B.P._{50}$ 66° C., $D_4^{20}$ 1.0274.

EXAMPLE 4

1.5 ml. of the catalyst solution described in Example 1 was added to a mixture of 677 g. silicochloroform and 810 g. hexamethyldisiloxane at room temperature while stirring. The temperature was kept in the range 23° to 25° C. After 6 hours the mixture obtained was mixed with 1 ml. dimethyl-coconut oil amine and stirred for another ½ hour at room temperature. After fractional distillation, 655 g. trimethylchlorosilane and 520 g. (52% of the theoretical) 1,1-dichlorotrimethyldisiloxane with a $B.P._{760}$ 106° C. were obtained.

EXAMPLE 5

A mixture of 850 g. tetrachlorosilane and 1,625 g. hexamethyldisiloxane was mixed with 7 ml. of the catalyst solution described in Example 1 at room temperature while stirring. After 8 hours the catalyst was inactivated by the addition of 8 ml. tri-n-butylamine.

Distillation of the reaction product yielded 925 g. trimethylchlorosilane, 658 g. (50% of the theoretical) 2,2-dichlorohexamethyltrisiloxane with a $B.P._{70}$ 97°–98° C., $D_4^{25}$ 1.001 and 144 g. of 1,1,1-trichlorotrimethyldisiloxane with a $B.P._{70}$ of 51–56° C.

EXAMPLE 6

810 g. hexamethyldisiloxane was added dropwise to a mixture of 859 g. tetrachlorosilane and 10 ml. of the catalyst solution described in Example 1 at room temperature while stirring over a period of 8 hours. Thereafter the mixture was stirred for another 2 hours and the catalyst was inactivated by adding 8 ml. dimethylcoconut oil amine to the reaction mixture. There was obtained by distillation: 734 g. trimethylchlorosilane, 656 g. (59% of the theoretical) 1,1,1-trichlorotrimethyldisiloxane with a $B.P._{760}$ 128° C. and 180 g. 2,2-dichlorohexamethyltrisiloxane.

EXAMPLE 7

1,620 g. of hexamethyldisiloxane was added dropwise to a mixture of 1,150 g. methyldichlorosilane and 2 ml. of the catalyst solution described in Example 1 at 0° C. while stirring over a period of 6 hours. Thereafter the catalyst was inactivated by addition of 1.5 ml. tri-n-butylamine. Distillation yielded 880 g. trimethylchlorosilane and 1,210 g. (72% of the theoretical) 1-chloro-1-methyl-2,2,2-trimethyldisiloxane with a $B.P._{750}$ 102° C.

EXAMPLE 8

2,430 g. hexamethyldisiloxane was added dropwise to a mixture of 2,116 g. vinylmethyldichlorosilane and 8 ml. of the catalyst solution described in Example 1 at 5°–10° C. while stirring over a period of 8 hours. Thereafter the catalyst was inactivated by addition of 6 ml. dimethyl-coconut oil amine. The distillation yielded 1,895 g. trimethylchlorosilane and 1,510 g. (78% of the theoretical) 1-chloro-1-vinyltetramethyldisiloxane with B.P.$_{714}$ 136°–137° C., $D_4^{25}$ 0.908.

EXAMPLE 9

A mixture of 592 octamethylcyclotetrasiloxane, 216 g. trimethylchlorosilane and 20 ml. of the catalyst solution described in Example 1 was stirred for 20 hours at 50° C. The following reaction had then essentially run off.

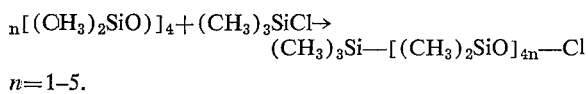

$n=1-5$.

EXAMPLE 10

A mixture of 592 g. octamethylcyclotetrasiloxane, 149.5 methyltrichlorosilane, 211.5 g. phenyltrichlorosilane was heated to reflux with 20 ml. of the catalyst solution described in Example 1 for 24 hours. The reaction of methyltrichlorosilane and phenyltrichlorosilane was practically complete to produce essentially linear dimethylsiloxane polymers having phenyldichlorosilyl, methyldichlorosilyl and chlorine endblockers.

EXAMPLE 11

A mixture of 370 g. octamethylcyclotetrasiloxane, 129 g. dimethyldichlorosilane and 3 ml. of the catalyst solution described in Example 1 was heated at slight reflux for 8 hours while stirring. A mixture of alpha,omega-dichlorodimethylpolysiloxanes of various chain length is obtained $[Cl[(CH_3)_2SiO]_zSi(CH_3)_2Cl]$.

EXAMPLE 12

A mixture of 592 g. of octamethylcyclotetrasiloxane, 170 g. silicontetrachloride and 10 ml. of the catalyst solution described in Example 1 was stirred at 40° C. for 15 hours. Silicontetrachloride was no longer present in the reaction mixture. The products obtained were essentially linear dimethylsiloxanes having trichlorosilyl and chlorine end groups, [e.g.

$Cl_3SiO[(CH_3)_2SiO]_zSi(CH_3)_2Cl$ $Cl_3SiO[(CH_3)_2SiO]_zSiCl_3$ and $Cl[(CH_3)_2SiO]_zSi(CH_3)_2Cl]$.

EXAMPLE 13

Equivalent results were achieved when Example 1 was repeated employing in place of the phosphoronitrile-chloride an equivalent amount of any of the following: phosphorous acid-dichloride-anilide, phosphorous acid-dichloride-methyl-anilide, phosphorous acid-dichloride-ethyl-anilide, phosphorous acid-dichloride-diphenylamide, phosphorous acid-dichloride-methylamide, phosphorous acid-dichloride-isopropylamide, phosphorous acid-dichloride - benzylamide, phosphoric acid-dichloride - anilide, phosphoric acid-dichloride-alpha, naphthylamide, phosphoric acid-dichloride-methylamide, and phosphoric acid-dichloride-ethylamide.

EXAMPLE 14

Equivalent results were achieved when Example 12 was repeated employing in place of the octamethyltetrasiloxane an equivalent amount of any one of the following tetramers: sym-tetramethyltetraphenylcyclosiloxane, sym-tetramethyltetra - 3,3,3-trifluoropropylcyclosiloxane, sym-tetramethyltetravinylcyclosiloxane, 1,1,3,5 - tetramethyl-3,7-diphenyl-5,7-divinylcyclosiloxane and octaethylcyclosiloxane.

That which is claimed is:

1. A method for preparing organohalogenosilicon compounds comprising admixing (1) an organohalogenosilicon compound containing at least one halogen atom bonded to silicon per molecule, the remaining valences of the silicon atoms being satisfied by oxygen atoms present as Si—O—Si linkages, hydrogen atoms, hydrocarbon radicals, halogenoaryl radicals and fluoroaliphatic hydrocarbon radicals and wherein any silicon atom bonded to halogen does not have more than three of the above defined organic groups bonded thereto with (2) an organosiloxane free of halogen substituents bonded to silicon wherein the organic radicals bonded to silicon are selected from the group consisting of monovalent hydrocarbon radicals, halogenoaryl radicals, fluorinated aliphatic hydrocarbon radicals and hydrogen atoms, said siloxane having a viscosity of less than 100,000 cs. at 25° C., admixing therewith a catalyst selected from the group consisting of amide halides of phosphorous of the general formula

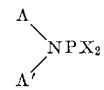

wherein A and A′ are radicals selected from the group consisting of alkyl, aryl, alkaryl, aralkyl radicals and hydrogen atoms, and X is a halogen atom, amide halides of phosphoric acids of the general formula

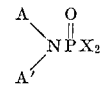

where A, A′ and X are as above defined and phosphoronitrile halides defined by the formula $(PNCl_2)_n$ where $n$ is 3, 4, 5 or 6, and thereafter separating the organohalogenosilicon products from the reaction mass.

2. The method of claim 1 further characterized in that the organohalogenosilicon compound is selected from silanes of the general formula $R_mSiX_{4-m}$ where each R is a monovalent hydrocarbon radical, a halogenated aryl radical, a fluorinated aliphatic hydrocarbon radical or a hydrogen atom, X is a halogen atom, $m$ is 0, 1, 2 or 3 and halogenosiloxanes of the unit formula

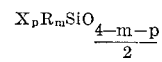

where X and R are as defined above, $p$ is a positive number such that the polymeric molecule contains at least one X substituent bonded to silicon, $m$ has an average value from 0 to 3.0—$p$ and $m+p$ does not exceed 3.

3. The method of claim 1 further characterized in that the organosiloxane free of halogen substituents bonded to silicon is a cyclic siloxane of the unit formula $R_2SiO$ containing at least 4 silicon atoms per molecule wherein R is a monovalent hydrocarbon radical, a halogenated aryl radical, a fluorinated aliphatic hydrocarbon radical or a hydrogen atom.

4. The method of claim 1 wherein the catalyst is defined by the formula

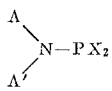

where each A and A′ is alkyl, aryl, alkaryl, or aralkyl radicals or a hydrogen atom and X is a halogen atom.

5. The method of claim 1 wherein the catalyst is defined by the formula

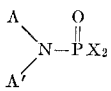

where each A and A′ is alkyl, aryl, alkaryl or aralkyl radicals or a hydrogen atom and X is a halogen atom.

6. A method for preparing organohalogenosilicon compounds comprising admixing (1) an organohalogenosilicon compound of the general formula $R_mSiX_{4-m}$ wherein each R is a monovalent substituent selected from the group consisting of monovalent hydrocarbon radicals, halogenated aryl radicals, fluorinated aliphatic hydrocarbon radicals, and hydrogen atoms, X is a halogen atom and m is 0, 1, 2 or 3, with (2) an organosiloxane free of halogen substituents bonded to silicon wherein the organic radicals bonded to silicon are selected from the group consisting of monovalent hydrocarbon radicals, halogenoaryl radicals, fluorinated aliphatic hydrocarbon radicals and hydrogen atoms said siloxane having a viscosity of less than 100,000 cs. at 25° C., and (3) 0.001 to 0.1 percent by weight based on the total weight of (1) and (2) of a catalyst defined by the formula $(PNCl_2)_n$ where n is 3–6, stirring the mixture for 1–24 hours, and thereafter inactivating the catalyst and separating the reaction products by fractional distillation.

7. The method of claim 6 further characterized in that the organosiloxane reactant (2) is a cyclic siloxane of the unit formula $R_2SiO$ containing at least 4 silicon atoms per molecule wherein R is a monovalent hydrocarbon radical, a halogenoaryl radical, a fluorinated aliphatic hydrocarbon radical or a hydrogen atom.

References Cited
UNITED STATES PATENTS

| | | | |
|---|---|---|---|
| 3,296,197 | 1/1967 | Tse C. Wu | 260—448.2X |
| 3,432,488 | 3/1969 | Finkbeiner et al. | 260—448.2X |
| 3,444,225 | 5/1969 | Boissieras et al. | 260—448.2 |
| 3,452,072 | 6/1969 | Sporck | 260—448.2 |
| 3,466,314 | 9/1969 | Moedritzer | 260—448.2 |

TOBIAS E. LEVOW, Primary Examiner

W. F. W. BELLAMY, Assistant Examiner

U.S. Cl. X.R.

260—46.5, 45.7